(12) United States Patent
Kuwahara et al.

(10) Patent No.: US 10,999,777 B2
(45) Date of Patent: May 4, 2021

(54) COMMUNICATION MANAGEMENT METHOD, COMMUNICATION SYSTEM, AND STORAGE MEDIUM

(71) Applicant: Hitachi, Ltd., Tokyo (JP)

(72) Inventors: Mikio Kuwahara, Tokyo (JP); Makiko Satoh, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 16/280,555

(22) Filed: Feb. 20, 2019

(65) Prior Publication Data

US 2019/0281527 A1 Sep. 12, 2019

(30) Foreign Application Priority Data

Mar. 7, 2018 (JP) .............................. JP2018-041020

(51) Int. Cl.
*H04W 40/16* (2009.01)
*H04W 72/12* (2009.01)
*H04W 56/00* (2009.01)
*H04W 72/04* (2009.01)

(52) U.S. Cl.
CPC ........ *H04W 40/16* (2013.01); *H04W 56/001* (2013.01); *H04W 56/004* (2013.01); *H04W 72/0446* (2013.01); *H04W 72/121* (2013.01)

(58) Field of Classification Search
CPC ............................. H04W 40/16; H04W 72/121
See application file for complete search history.

(56) References Cited

U.S. PATENT DOCUMENTS

| | | | |
|---|---|---|---|
| 7,197,291 B2* | 3/2007 | Mach ................... | H04B 1/1027 375/148 |
| 7,751,377 B2* | 7/2010 | Yang ..................... | H04W 72/02 370/338 |
| 8,249,031 B1* | 8/2012 | Hirsch .............. | H04W 72/1215 370/336 |
| 8,335,206 B1* | 12/2012 | Hirsch .............. | H04W 72/1215 370/350 |
| 9,948,383 B1* | 4/2018 | Thommana ........... | H04B 1/713 |
| 10,070,406 B2* | 9/2018 | Takekawa ............. | H04W 4/023 |
| 10,110,287 B1* | 10/2018 | Crasmariu ........... | H04B 7/0456 |
| 10,390,311 B2* | 8/2019 | Proctor, Jr. .......... | H04W 76/25 |

(Continued)

FOREIGN PATENT DOCUMENTS

JP 2017-212494 A 11/2017

*Primary Examiner* — Parth Patel
(74) *Attorney, Agent, or Firm* — Crowell & Moring LLP

(57) ABSTRACT

To improve line utilization efficiency in short-cycle data collection, it is provided a method of managing communication in a communication system, the communication system including: an aggregation unit configured to receive information through a communication path from a plurality of terminals, which are sources of information transmission; and a reservation unit configured to determine, for each of the plurality of terminals, timing at which the terminal transmits a signal, the method comprising steps of: receiving, by the reservation unit, a relative time specified by a user as a time at which the terminal transmits the information; and determining, by the reservation unit, as scheduling information, an absolute time unique throughout the communication system so that interference with another communication session is avoided when the terminal holds communication at the relative time.

9 Claims, 11 Drawing Sheets

(56) References Cited

U.S. PATENT DOCUMENTS

| | | | |
|---|---|---|---|
| 10,666,836 B2* | 5/2020 | Christi | H04N 5/04 |
| 2003/0012174 A1* | 1/2003 | Bender | H04W 16/12 |
| | | | 370/347 |
| 2006/0205401 A1* | 9/2006 | Palin | H04M 1/6066 |
| | | | 455/425 |
| 2006/0292986 A1* | 12/2006 | Bitran | H04W 16/14 |
| | | | 455/41.2 |
| 2007/0004337 A1* | 1/2007 | Biswas | H04L 27/2695 |
| | | | 455/63.1 |
| 2007/0021066 A1* | 1/2007 | Dravida | H04W 16/14 |
| | | | 455/41.2 |
| 2007/0223430 A1* | 9/2007 | Desai | H04L 1/1854 |
| | | | 370/338 |
| 2008/0279138 A1* | 11/2008 | Gonikberg | H04W 88/06 |
| | | | 370/328 |
| 2009/0034491 A1* | 2/2009 | Adams | H04B 7/2656 |
| | | | 370/337 |
| 2009/0197639 A1* | 8/2009 | Khairmode | H04W 88/10 |
| | | | 455/553.1 |
| 2010/0238883 A1* | 9/2010 | Borran | H04W 16/10 |
| | | | 370/329 |
| 2010/0323625 A1* | 12/2010 | Kishigami | H04B 7/0434 |
| | | | 455/65 |
| 2011/0255570 A1* | 10/2011 | Fujiwara | H04B 1/7143 |
| | | | 375/133 |
| 2012/0140690 A1* | 6/2012 | Choi | H04W 72/1231 |
| | | | 370/311 |
| 2012/0257585 A1* | 10/2012 | Sydor | H04W 72/082 |
| | | | 370/329 |
| 2013/0121191 A1* | 5/2013 | Song | H04W 36/08 |
| | | | 370/252 |
| 2013/0155931 A1* | 6/2013 | Prajapati | H04W 74/04 |
| | | | 370/311 |
| 2013/0260686 A1* | 10/2013 | Mukherjee | H04W 4/80 |
| | | | 455/41.2 |
| 2014/0269309 A1* | 9/2014 | Lee | H04W 52/0235 |
| | | | 370/235 |
| 2014/0293968 A1* | 10/2014 | Ebrahimi Tazeh Mahalleh | |
| | | | H04W 56/001 |
| | | | 370/336 |
| 2015/0271665 A1* | 9/2015 | Lowenmark | H04W 74/0833 |
| | | | 370/329 |
| 2015/0289163 A1* | 10/2015 | Mineta | H04W 72/042 |
| | | | 370/320 |
| 2016/0044616 A1* | 2/2016 | Lee | H04W 56/0095 |
| | | | 370/350 |
| 2017/0064583 A1* | 3/2017 | Roy | H04W 36/0005 |
| 2017/0105185 A1* | 4/2017 | Chen | G01S 1/024 |
| 2017/0251488 A1* | 8/2017 | Urban | H04W 72/1263 |
| 2017/0359790 A1* | 12/2017 | Wang | H04J 11/005 |
| 2018/0019905 A1* | 1/2018 | Zhu | H04L 25/03159 |
| 2018/0167312 A1* | 6/2018 | Liu | H04W 40/244 |
| 2018/0242339 A1* | 8/2018 | Choudhary | H04W 4/80 |
| 2018/0270007 A1* | 9/2018 | Sandberg | H04L 5/0053 |
| 2019/0268868 A1* | 8/2019 | Abedini | H04W 74/0833 |
| 2019/0281527 A1* | 9/2019 | Kuwahara | H04W 72/121 |
| 2019/0362738 A1* | 11/2019 | Mei | H04M 1/725 |
| 2020/0037385 A1* | 1/2020 | Park | H04W 76/18 |
| 2020/0084730 A1* | 3/2020 | Ji | H04W 52/18 |

* cited by examiner und STORAGE MEDIUM

COMMUNICATION MANAGEMENT METHOD, COMMUNICATION SYSTEM, AND STORAGE MEDIUM

CLAIM OF PRIORITY

The present application claims priority from Japanese patent application JP 2018-41020 filed on Mar. 7, 2018, the content of which is hereby incorporated by reference into this application.

BACKGROUND OF THE INVENTION

This invention relates to a communication system.

In a contract on the provision of a communication network service, a price is determined by a band of a line, a QoS, and a time slot, which are components of policies shared between a service provider and a service recipient, and the service provider provides a line and a network device that are shared under the determined conditions. In an IoT system in which an object, for example, a sensor, serves as a source of information transmission, machine-to-machine (M2M) communication is expected to increase. In the collection of decentralized information from sensors or the like, a large number of sensors distributed in a decentralized manner periodically report information, the pieces of reported data are aggregated in a separately provided central processing device, and the aggregated information is utilized as secondary information. In JP 2017-212494 A, there is disclosed a technology of specifying a time slot so that sensor data requiring a fairly long information collection cycle is communicated when communication traffic is light.

A brief description is given on an example of the related art according to JP 2017-212494 A with reference to FIG. 15. An example of hour-to-hour fluctuations in traffic in a day in a general-purpose communication system is illustrated in a lower part of FIG. 15. A horizontal axis 1000 represents a day (24 hours). An hour-long time slot is represented by a strip 1020, and twenty-four slots represent 24 hours. A black portion in a lower part of each strip indicates average traffic 1010 in an hour of the corresponding time slot. A white portion in an upper part of each strip indicates the capacity of a network, and an arrow 1030 indicates a margin (i.e., a difference between the capacity and the occupied traffic) of the network.

Key points of the technology disclosed in JP 2017-212494 A are described with reference to FIG. 15. Periods "a" and "b" are light traffic periods, which are time slots light in communication traffic in the day's traffic, and having ample room for additional transferred traffic. A case of additionally transferring IoT traffic over this network is considered. The disclosure of JP 2017-212494 A includes setting the transmission time of an IoT device so that IoT traffic is transmitted in light traffic time slots ("a" and "b" in FIG. 15), which are acquired from an analysis of traffic on the network.

Communication in the light traffic time slots is illustrated in an upper part of FIG. 16. FIG. 16 is divided into two, an upper part and a lower part, and black bars indicating timing (for example, timing 1101) and white bars indicating timing (for example, timing 1111) are illustrated in the upper part. The white-bar timing 1111 represents timing at which a terminal A transmits data, and the black-bar timing 1101 represents timing at which information transmitted by the terminal A is referred to, namely, timing to be utilized by a central processing device. According to JP 2017-212494 A, white-colored timing bars are all arranged in the time slots "a" and "b", which are light traffic periods, as illustrated in FIG. 15. In other words, a scheduler has, in advance, knowledge of when light traffic periods are through research, and generates data transmission timing, which is indicated by a white bar, based on the knowledge.

Although the disclosure of JP 2017-212494 A includes utilizing a light traffic time slot of a network device to collect non-real-time data, for example, daily, weekly, or monthly collected data about plant growth or cracks in a bridge, from a sensor for IoT, information collection in a cycle fairly shorter than a day is not considered, and the technology of JP 2017-212494 A is not capable of dealing with communication in such a short cycle. A problem in this regard is described with reference to FIG. 16. A horizontal axis 1000 in FIG. 16 represents a day as in FIG. 15, and the timing of collecting data four times a day is illustrated in FIG. 16. As in FIG. 15, white-bar timing (1111, 1112, 1113, and 1114) of each terminal represents timing at which the terminal transmits data, and black-bar timing (1101, 1102, 1103, and 1104) represents timing at which pieces of data transmitted from terminals are aggregated and processed. The time slots "a" and "b" in the example of FIG. 16 precede the data processing timing 1101 and the data processing timing 1104, respectively. The transmission timing 1111 and the transmission timing 1114 at which sensor information is transmitted are accordingly placed in the light traffic periods. For the data processing timing 1102 and 1103, however, transmission timing aimed for light traffic time slots cannot be set because there are no preceding light traffic time slots.

When a user is allowed to freely define the use of a communication path, on the other hand, burst traffic on the network and other problems arise as pointed out by the example of the related art. In the case of hourly report, for example, it is difficult for an application developer to design an application taking the network state into account, and communication is accordingly expected to concentrate at 00:00 every hour. As a result, traffic concentrates around 00:00, which does not help to disperse traffic. Some measure to control timing is therefore required.

SUMMARY OF THE INVENTION

Environment data or similar sensor data requires to be collected in a short transmission cycle, for example, every hour or every few minutes. The method disclosed in JP 2017-212494 A is not capable of dealing with such uses.

NB-IoT discussed in 3GPP, which is a standardization organization, and other technologies are intended to accommodate IoT traffic in a channel definitively separate from a general-use channel by the exclusive allocation of a part of a band for other general uses to IoT, or by other measures. The utilization efficiency of the IoT-exclusive channel cannot be improved through an analysis of general-use traffic, and the method disclosed in JP 2017-212494 A is not capable of dealing with such cases.

As a way to build a successful service among a diversity of services developed, lean startup and other development methods in which specifications are changed while a service is run are attracting attention. The lean startup is a method of developing application software through changes made to the use and specifications of a service while the service is run. With this trend, it is becoming difficult in application software development to accomplish high network efficiency, for which an abundance of knowledge about networks is prerequisite, and how to build an effective system while balancing cost reduction and development speed improvement and while changing the use and the like of a network is an issue to be addressed. On the other hand, a mechanism for simplifying network management is demanded as well in light of limited cost that can be spent on increasingly complex network management.

The representative one of inventions disclosed in this application is outlined as follows. There is provided a method of managing communication in a communication system, the communication system including: an aggregation unit configured to receive information through a communication path from a plurality of terminals, which are sources of information transmission; and a reservation unit configured to determine, for each of the plurality of terminals, timing at which the terminal transmits a signal, the method comprising steps of: receiving, by the reservation unit, a relative time specified by a user as a time at which the terminal transmits the information; and determining, by the reservation unit, as scheduling information, an absolute time unique throughout the communication system so that interference with another communication session is avoided when the terminal holds communication at the relative time.

According to one embodiment of this invention, line utilization efficiency can be improved in short-cycle data collection. Objects, configurations, and effects of this invention other than those described above are made clear in the following description of embodiments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Figure 1:
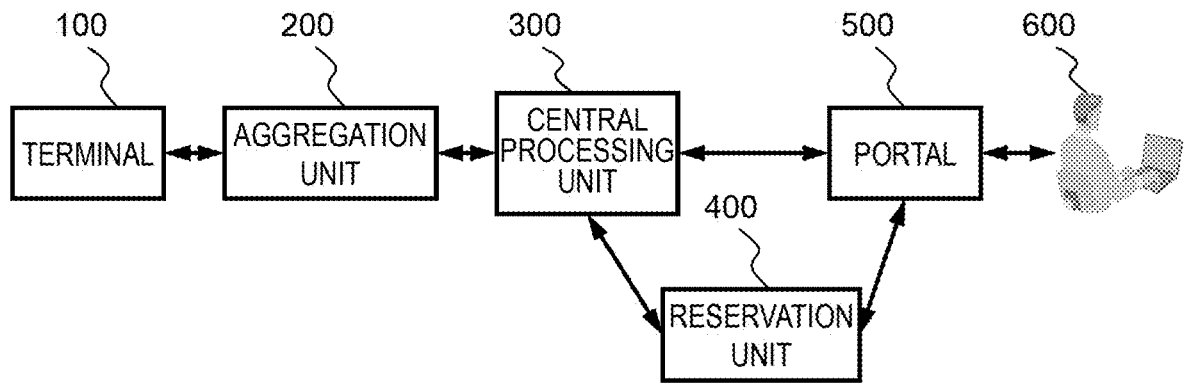
FIG. 1 is a diagram for illustrating a configuration of a network system according to a first embodiment.

A first embodiment of this invention is described. FIG. 1 is a diagram for illustrating the configuration of a network system of the first embodiment. In FIG. 1, a sensor is mounted to a terminal 100 to perform periodical measurement, normally in a cycle shorter than a day. A communication unit is also mounted to the terminal 100 to periodically transmit data measured by the sensor to a central processing unit 300. A wireless line, for example, is used as a line along which the data is collected (the line is represented by the double-headed arrow between the terminal 100 and an aggregation unit 200 in FIG. 1). With a wireless line, the set-up cost is lower than when a wired line is used, even for long-distance communication, because the cost of laying a physical line is eliminated.

The aggregation unit 200 is provided opposite from the terminal 100 across the wireless line, as an upstream-side terminating apparatus of the wireless line. The aggregation unit 200 terminates the wireless line and converts a signal received in the form of a radio wave into digital data. The data collected by the aggregation unit 200 is sent to the central processing unit 300 through a backhaul line. A backhaul line is normally a wired line, and for example, an Internet line or an exclusive line provided by a telecommunications carrier is used as a backhaul line. The central processing unit 300 collection, aggregates and processes the collected primary data to convert the primary data into secondary data usable by a third party.

Although only one terminal 100 is illustrated in FIG. 1, a large number of terminals 100 are coupled to the aggregation unit 200 in an IoT system to collect various types of information. The terminals 100 are set up in dispersed locations, and in some cases, a plurality of aggregation units 200 are arranged to provide support for areas in which the terminals 100 are set up. When a large number of pieces of data are transmitted simultaneously or in the same time period, transmitted signals overlap with each other, causing interference. The resultant problem is that the aggregation units 200 on the reception side fail to decode the data and cannot receive accurate information.

What is important in solving this problem is a mechanism by which data transmission timing is adjusted in a system as a whole and the terminals 100 transmit data at the adjusted timing (a scheduling function). When various types of sensors are included, the frequency of collection varies depending on the type of data and the location of data measurement. It is difficult for a user 600 or an application developer to think up how to conduct a system-wide adjustment of data transmission timing for a large number of terminals 100. The first embodiment is accordingly configured so that the communication unit mounted to each terminal 100 notifies of an absolute time at which transmission is possible, and so that an offset as a parameter required to determine the absolute time is determined by a reservation unit 400 while the user 600 is required only to specify the transmission cycle and is not required to specify the offset.

In the first embodiment, the reservation unit 400 determines data transmission timing and notifies the determined timing to the terminals 100. The wireless communication path may use, for example, LoRaWAN or other communication methods exclusive to IoT, or NB-IoT or other mobile methods. In a mobile communication method, the aggregation unit 200 generally has a scheduler function and dynamically allocates lines in response to schedule allocation requests transmitted by the terminals 100. The mechanism of the mobile communication method is described in order to clarify the difference between the mobile communication method and the first embodiment.

The terminals 100 transmit data in accordance with scheduling information, which is created and instructed by the aggregation unit 200. However, the scheduling information created by the aggregation unit 200 merely determines the priority order of schedule allocation requests received from the terminals 100 and cached in a buffer at the time, by following a specific algorithm, and is used to control only short-term scheduling, 1 second at most. The only effect that can be expected from this scheduling control is therefore the avoidance of a collision between messages in as short a time as 1 second or less. It is difficult with this scheduling control to effectively utilize lines through the dispersion of the requests themselves in an environment in which a large number of terminals 100 concurrently request scheduling.

With the scheduler of the mobile communication method, the utilization ratio of a line rises to the limit at a specific time when traffic concentrates, and the line is flooded beyond capacity. When traffic from a large number of terminals 100 concentrates on a specific time, for example, 00:00, a large number of schedule requests are transmitted substantially simultaneously from the terminals 100, and line processing reaches saturation in the bandwidth of a line available for allocation, with the result that a back-up of communication flow lasts long. In order to avoid this situation, the reservation unit 400 in the first embodiment disperses transmission timing in advance so that the concentration of traffic on a specific time can be avoided, by taking the nature of IoT traffic into consideration. The concentration of traffic on a specific time can be avoided in this manner.

The operation of the reservation unit 400 is described next. The reservation unit 400 divides a day into time slots at a fixed time resolution, for example, 5 milliseconds or 30 milliseconds, and uses an identifier allocated to each of the slots to notify the data transmission timing to the terminals 100. In the first embodiment, a portal 500 presents a service menu of a network. The network system provides a mechanism with which the user selects a service to use from the presented menu via an API. The portal 500 presents the user with a communication service menu on which a choice can be made from a plurality of report cycles (relative times, for example, a 1-minute cycle and a 1-hour cycle), because what is important particularly in IoT is the cycle of report.

The central processing unit 300, the reservation unit 400, and the portal 500 in the first embodiment are implemented by a computer system including a processor (a CPU), a storage apparatus, and a communication interface.

The processor executes a program stored in a memory. The memory includes a ROM, which is a non-volatile storage element, and a RAM, which is a volatile storage element. The ROM stores an unchanging program (for example, BIOS). The RAM is a dynamic random access memory (DRAM) or a similar high-speed volatile storage element, and temporarily stores a program to be executed by the processor and data to be used when the program is executed.

The storage apparatus is a large-capacity non-volatile storage apparatus, for example, a magnetic storage apparatus (an HDD) or a flash memory (an SSD). The storage apparatus stores data to be accessed when a program is executed. The storage apparatus may also store a program to be executed by the processor. The program in this case is read out from the storage apparatus, and is loaded onto the memory to be executed by the processor.

A program to be executed by the CPU is provided to the computer system via a removal medium (a CD-ROM, a flash memory, or the like) or a network, and is stored on the non-volatile storage apparatus, which is a non-transient storage medium. It is therefore preferred for the computer system to include an interface through which data is read out from a removable medium.

The central processing unit 300, the reservation unit 400, and the portal 500 may operate on one physical computer, or may operate on a virtual computer built from a plurality of physical resources in a computer system that includes a plurality of logically or physically configured computers.

Figure 2:
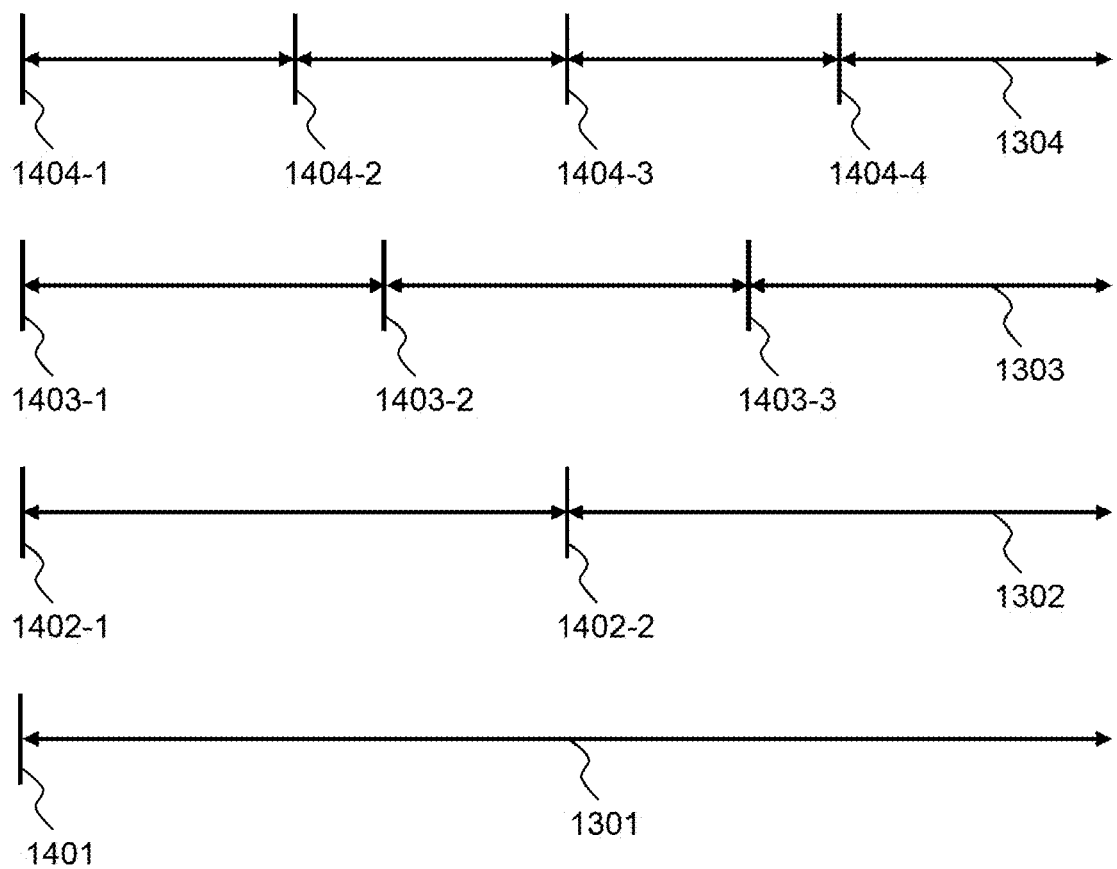
FIG. 2. is a diagram for illustrating transmission cycle types according to the first embodiment.

Transmission cycle types are described with reference to FIG. 2. In FIG. 2, a horizontal arrow 1301 represents a day (24 hours), for example. A vertical bar denoted by 140X indicates signal transmission at the timing (the slot). A vertical bar 1401 indicates a service for which transmission is executed only once a day. Each horizontal arrows 1302 represent a half of a day (12 hours), and transmission timing 1402-1 and transmission timing 1402-2 indicate two transmission sessions spaced apart by 12 hours in a day. Horizontal arrows 1303 and 1304 are similar to the horizontal arrows 1302, and each horizontal arrow 1304 represents ¼ day (6 hours). Transmission timing 1404-1, transmission timing 1404-2, transmission timing 1404-3, and transmission timing 1404-4 indicate four transmission sessions spaced apart by 6 hours in a day. The user can sign up for a communication line through which a report is made in, for example, 1-minute cycles by selecting from a menu of transmission cycles like this.

The point here is that the user selects only the "cycle" from the menu, while the "offset", which is another parameter required to establish an absolute time, is hidden from and not selected by the user. The reservation unit 400 determines transmission timing in the form of an absolute time by adjusting the offset of a plurality of lines so that a communication error due to an overlap of transmission timing among a plurality of terminals 100 is avoided, while maintaining the "cycle" specified by the user. The reservation unit 400 notifies the determined absolute time (the cycle and the offset) to each terminal 100 to avoid interference. According to this embodiment in which the only item in the contract with the user is the cycle and the offset is hidden from the user, the user can procure a communication line without paying particular attention to the interference and other problems. The reservation unit 400 is also capable of avoiding the concentration of transmission timing throughout the system by notifying a transmission cycle that includes the offset to each terminal 100.

Figure 3:
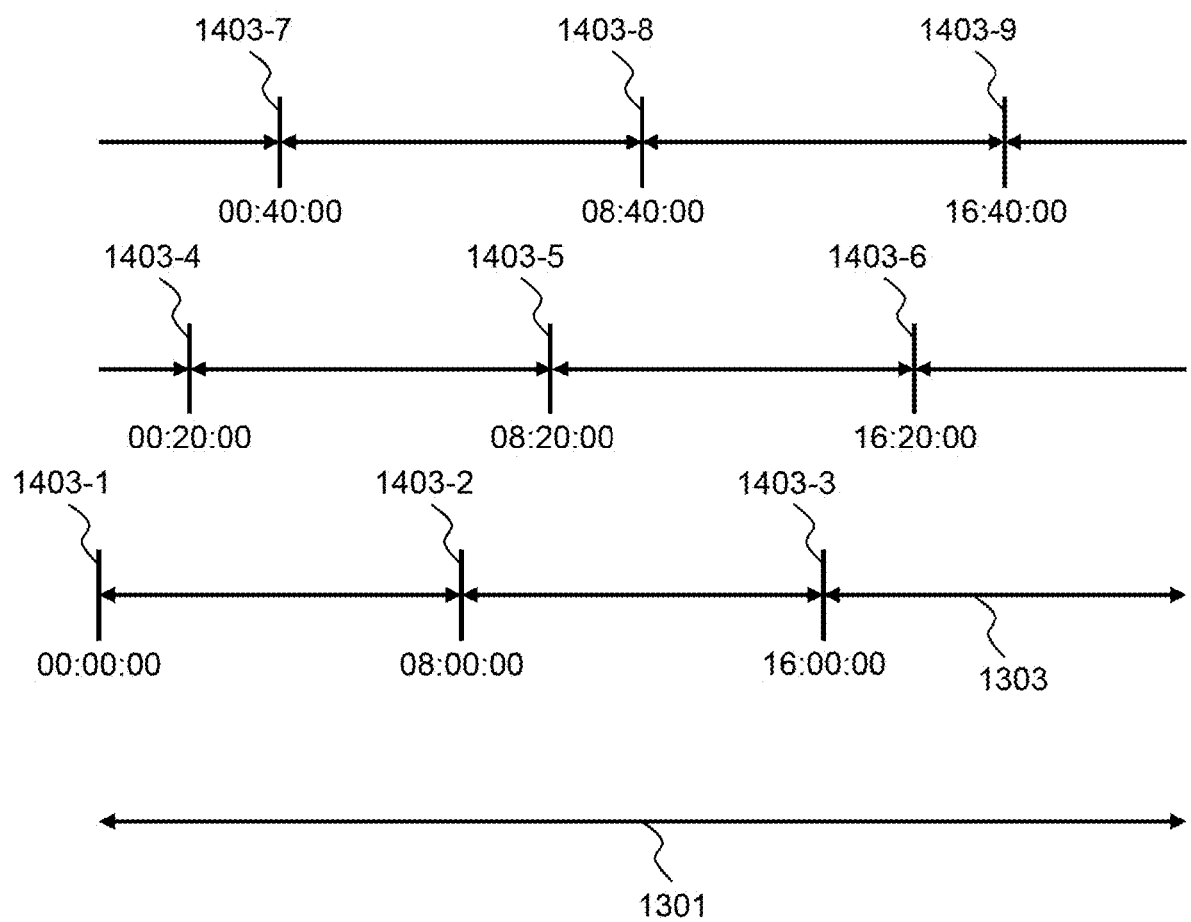
FIG. 3 is a diagram for illustrating difference of offset in the same transmission cycle according to the first embodiment.

The concept of the offset is described with reference to FIG. 3. FIG. 3 is a diagram for illustrating points in time as transmission timing having the same transmission cycle and different offsets, and the horizontal axis 1301 represents a day (24 hours). In the example of FIG. 3, a day is divided into three on the horizontal axis 1303, and data is transmitted in three transmission sessions spaced apart by 8 hours and indicated by transmission timing 1403-1, transmission timing 1403-2, and transmission timing 1403-3 on 1303 at 00:00, 08:00, and 16:00. Three transmission sessions offset by 20 minutes and indicated by transmission timing 1403-4 at 00:20, transmission timing 1403-5 at 08:20, and transmission timing 1403-6 at 16:20 are also illustrated in FIG. 3. In the set of transmission sessions for which transmission times are not offset (transmission timing: 1403-1, 1403-2, 1403-3) and the set of transmission sessions for which transmission times are offset by 20 minutes (transmission timing: 1403-4, 1403-5, 1403-6), data transmission of the former set and data transmission of the latter set have the same "cycle" and are staggered by 20 minutes. The two sets have a difference of 20 minutes in terms of "offset" although the "cycle" is the same. The transmission timing (an absolute time at which data is transmitted) of the former set and the transmission timing of the latter set accordingly do not coincide with each other. Schedule allocation that avoids the concentration of traffic is thus accomplished by adjusting the offset even when the transmission cycle is the same.

The reservation unit 400 acquires an offset by which the timing of data transmission in a cycle requested by the user is staggered to avoid an overlap with transmission timing allocated in the past, thereby determining the absolute time (a pair of the cycle and the offset) of the transmission timing of the relevant terminal 100.

Figure 4:
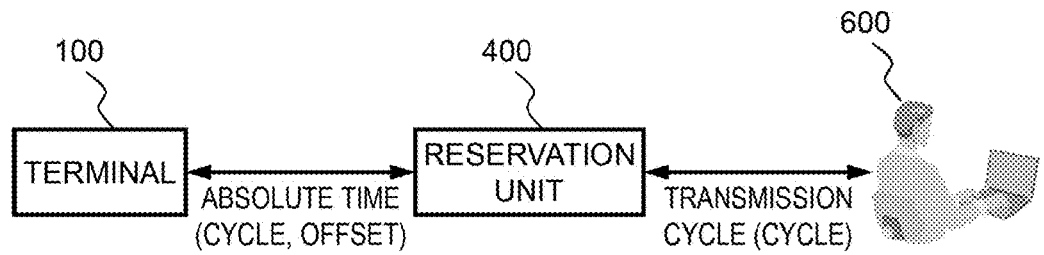
FIG. 4 is a diagram for illustrating an interface of a reservation unit according to the first embodiment.

The reservation unit 400 includes an interface to the user side and an interface to the terminals 100, and FIG. 4 is a diagram for illustrating a difference between the interfaces. Transmission timing allocated by the reservation unit 400 to the terminals 100 is information indicating a group of absolute times each of which is made up of the "cycle" and the "offset" as described above. Information about scheduling exchanged between the reservation unit 400 and the user 600, on the other hand, is only information about a relative time made up of the "cycle", and does not include information about the offset. The cycle specified by the reservation unit 400 to the relevant terminal 100 matches the cycle requested by the user, and a relative transmission cycle selected by the user is kept. This mechanism imparts the user the benefit of executing interference avoidance processing, which is important on the network side and, at the same time, frees the user from the burden of paying attention to details of the interference avoidance operation. The user can accordingly use communication with the absolute transmission time and other types of detailed information hidden from the user. The mechanism also enables the reservation unit 400 to allocate effectively dispersed transmission times even when the transmission cycle is fairly shorter than a day. The problems described above are accordingly solved.

For example, the terminal 100 from which a signal is transmitted in 1-minute cycles requires to be notified of information about 1,440 transmission slots a day, and is notified of absolute times each of which is identified by two types of information, the cycle and the offset, instead of being notified of the identifiers of the slots. When a day is sectioned into slots at a resolution of 10 milliseconds, for example, the number of slots in a day is 8,640,000. When the transmission cycle is 1-minute long in this case, data is transmitted every 6,000 slots. The timing of 1,440 transmission sessions of the terminal 100 can be identified from the identifier (offset) of the first slot of the day, which is within the first 1 minute from 0 a.m. when the start of the day is 0 a.m., and from the cycle information indicating that data is transmitted every 6,000 slots.

The reservation unit 400 transmits scheduling information to the terminals 100 via the central processing unit 300 and the aggregation unit 200. The terminals 100 each receive information about transmission timing, and transmit data at the new transmission timing as instructed by the received information.

Communication in a service of the first embodiment is held in a specific cycle and is controlled with ease so that interference is avoided, which facilitates automation of management. The increased management cost, which is one of the problems described above, is accordingly reduced and solved. For example, communication related to a trouble that has occurred at a known time is easily identified, and it is therefore easy to identify a relevant node related to the trouble.

Figure 5:
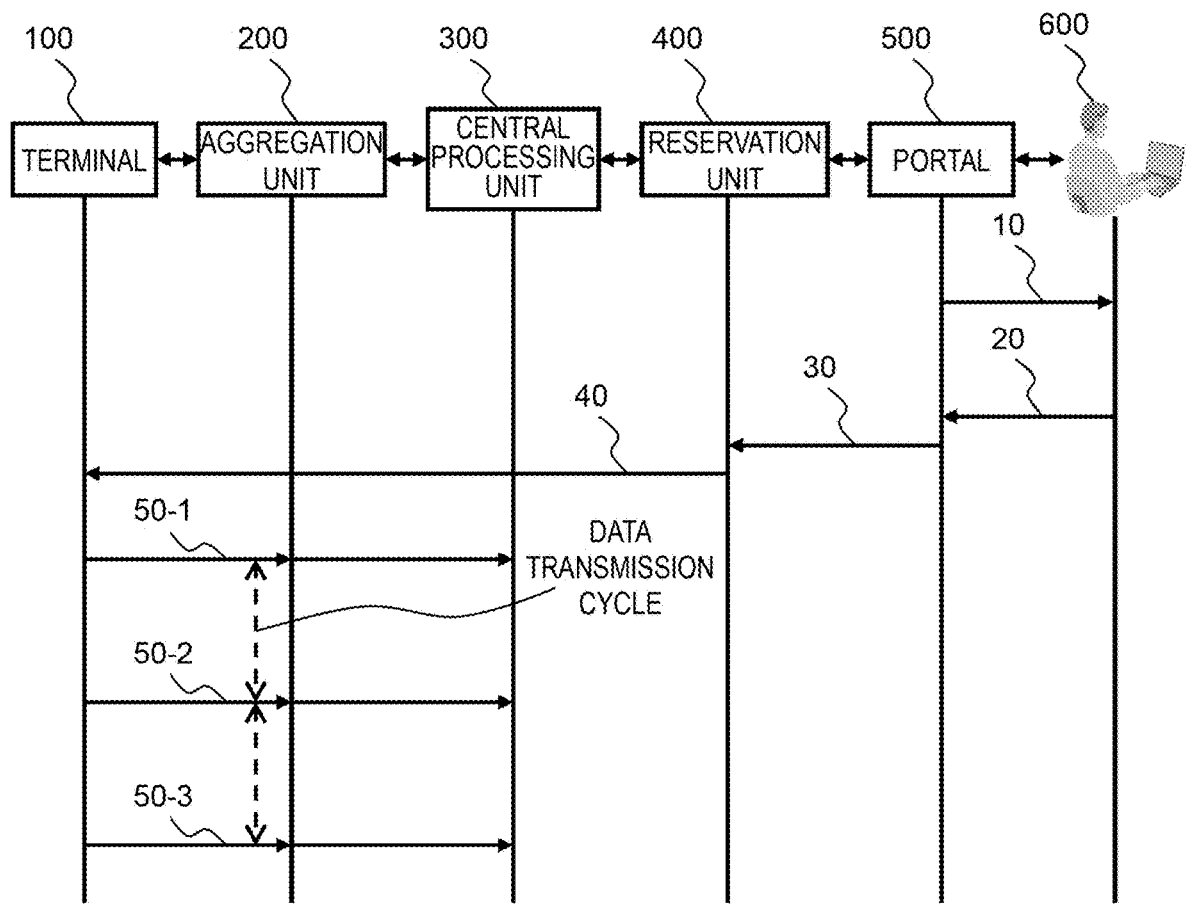
FIG. 5 is a sequence diagram illustrating steps for allocating a schedule according to the first embodiment.

Steps of allocating a schedule are described with reference to FIG. 5. One terminal 100, the aggregation unit 200, the central processing unit 300, the reservation unit 400, the portal 500, and the user 600 are illustrated at the top of FIG. 5. First, the portal 500 presents the user with several cycle options in order to allow the user to select a cycle (10). The cycle options may be presented to the user in the form of the template of a communication service to be provided. The user 600 selects a cycle from the options presented by the portal 500, and notifies the choice to the portal 500 (20). The portal 500 receives the selection result and notifies the selected cycle to the reservation unit 400 (30). The reservation unit 400 acquires, from currently allocated timing and the cycle received from the portal 500, an offset at which a conflict in data transmission timing (namely, interference with another communication session) is avoided, and notifies the acquired offset and the cycle to the terminal 100 (40). The terminal 100 reports a measurement result at timing determined by the specified offset and cycle (50-1, 50-2, and 50-3).

Figure 6:
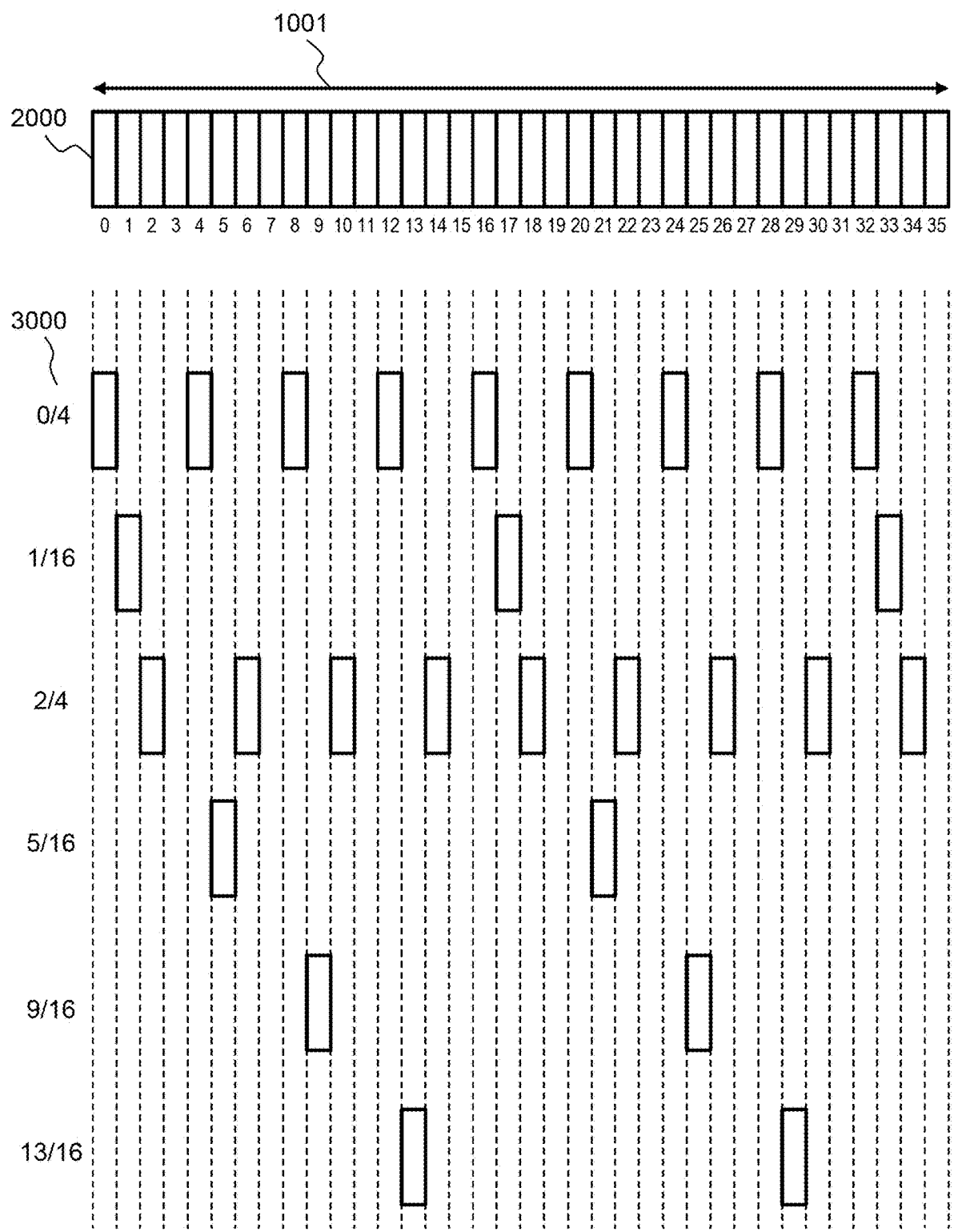
FIG. 6 is a diagram illustrating an example of slot allocation according to the first embodiment.

An example of slot allocation in which slots for transmission sessions having different cycles and offset differently are set so that an overlap between the slots is avoided is described with reference to FIG. 6. A horizontal axis 1001 in FIG. 6 represents a length of time of 36×10 milliseconds, and thirty-six slots 2000 are arranged in this length of time. A scheduling result 3000 is also illustrated in FIG. 6 to illustrate, as an example, transmission timing allocated every 40 milliseconds and marked by "0/4". The mark is expressed as "X/Y", and X and Y in "X/Y" represent the offset and the cycle, respectively. Six scheduling types ("0/4", "1/16", "2/4", "5/16", "9/16", and "13/16") illustrated in FIG. 6 each allow slots to be allocated without a temporal conflict. Although it appears to the user as though slots of two types of 40-millisecond cycle and slots of four types of 160-millisecond cycles are allocated, the reservation unit 400 is capable of presenting to the user allocation in which the slots can be used simultaneously without a conflict between the slots by adjusting the offset. Allocation avoiding a temporal conflict is generated without requiring the user to be conscious of the offset, thereby solving the problems described above.

Figure 7:
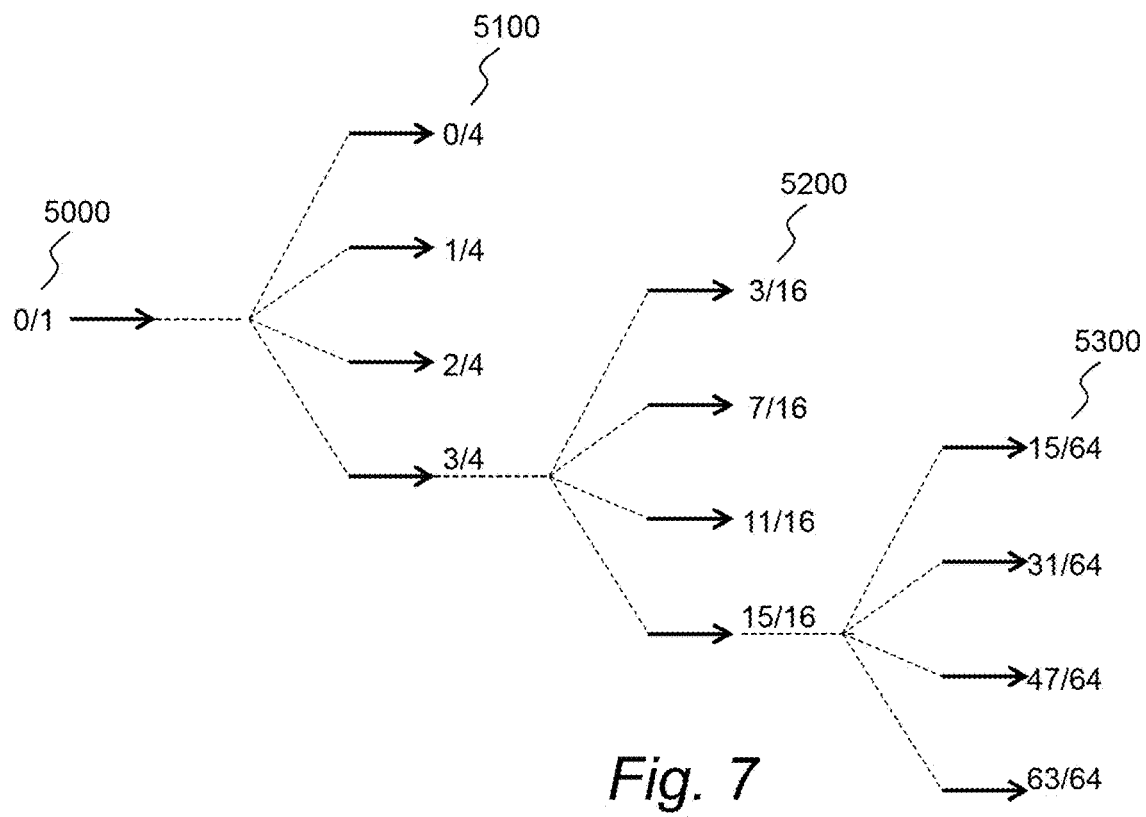
FIG. 7. is a diagram illustrating a simple method of forming a pair of the cycle and the offset at which a conflict between allocated slots is avoided according to the first embodiment.

In the example of FIG. 6, a 1/4-slot is further divided into four to create 1/16-slots, and four 1/16-slots are used as different offsets. Through similar operation, 1/64-slots can also be created as illustrated in FIG. 7. A simple method of forming a pair of the cycle and the offset at which a conflict between allocated slots is avoided is described with reference to FIG. 7. A slot of "0/1" at the left edge of FIG. 7 may be broken into four slots having a four-slot cycle and respectively having an offset of 0, an offset of 1, an offset of 2, and an offset of 3. There is no temporal conflict among the four slots. Out of the four slots, "3/4" alone may be broken into four slots through further quartering (i.e., the division of the original "0/1" slot into sixteen slots). The offsets of the new four slots are set to 3, 7, 11, and 15, respectively, to thereby avoid a temporal conflict among "0/4", "1/4", "2/4", "3/16", "7/16", "11/16", and "15/16". Slots spaced in this manner can be used fully. The slot "15/16" may be further quartered to create timing of a 64-slot cycle, and there is no temporal conflict among the resultant slots "0/4", "1/4", "2/4", "3/16", "7/16", "11/16", "15/64", "31/64", "47/64", and "63/64". This means that allocation without a temporal conflict is successfully generated, and the problems described above are accordingly solved.

The reservation unit 400 creates slots of various sizes by division as illustrated in FIG. 7, and stores the allocation state of each slot created by division in advance. The reservation unit 400 may search for an available slot suitable for a data size desired by the user and a data transmission cycle specified through the portal 500 by the user to determine an offset and a cycle that are associated with the found available slot.

Figure 8:
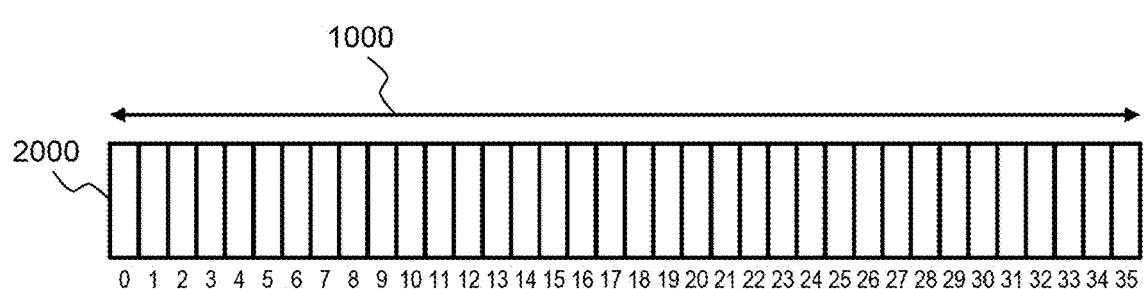
FIG. 8. is a diagram illustrating an example of transmitting a signal too long to be contained in one slot according to the first embodiment.
Figure 8:
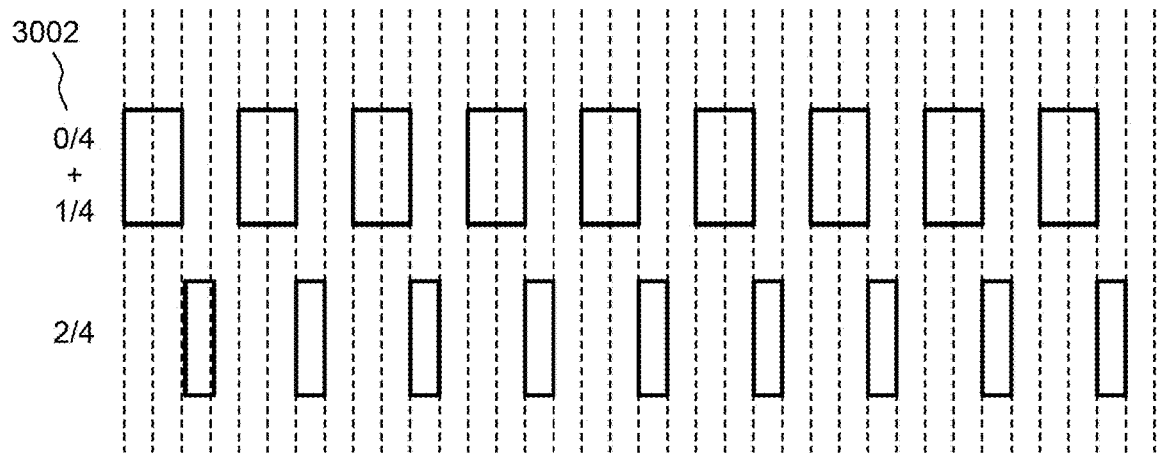

Slots of a fixed length may not be capable of dealing with various types of communication data depending on the communication method. For instance, a problem arises when the symbol length of a signal sent in a single transmission session is long. To transmit a signal too long to be contained in one slot, consecutive slots (0/4 and 1/4) are allocated as indicated by 3002 in FIG. 8. The reservation unit 400 is made applicable to a communication method in which a signal has a long symbol length or a variable length in this manner.

Figure 9:
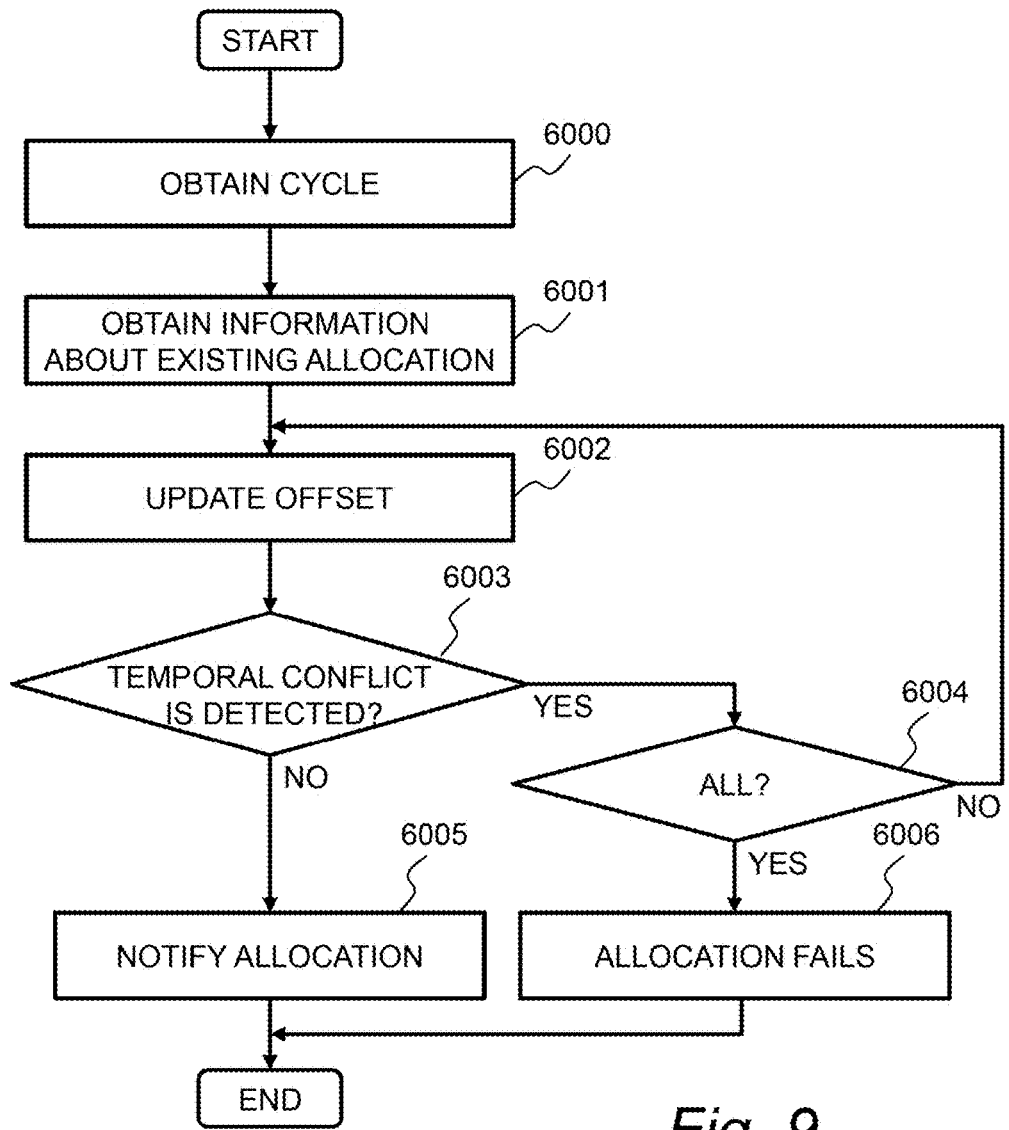
FIG. 9. is a flowchart illustrating an example of an operation of the reservation unit according to the first embodiment.

An example of the operation of the reservation unit 400 is described with reference to FIG. 9. The reservation unit 400 executes processing illustrated in FIG. 9 when receiving the specification of the "cycle" from the user 600.

The reservation unit 400 first receives a cycle from the portal 500 in Step 6000. In Step 6001, information about already allocated cycles and offsets is obtained. The reservation unit 400 keeps information about already allocated cycles and offsets, and the kept information is obtained in Step 6001. In a second embodiment of this invention described later, a storage unit 700 is provided separately from the reservation unit 400. The storage unit 700 of the second embodiment is implemented by a large-capacity storage apparatus to store past allocation information stretching over a long period of time. The reservation unit 400 of the first embodiment, on the other hand, stores allocation information of immediate past.

In Step 6002, a new offset is obtained starting from an offset of, for example, 0. In Step S6003, interim allocation using the obtained new offset is checked against the information about the already allocated cycle and offset to determine whether there is a conflict between the interim allocation and the existing allocation. When there is no conflict ("No" in Step 6003), the new allocation is notified to the terminal 100 in Step 6005, and the allocation processing is then ended.

When a conflict is detected in Step 6003 ("Yes" in Step 6003), on the other hand, whether examination is finished for every offset is determined in Step 6004. When there are some offsets left to examine, the allocation processing returns to Step 6002 to continue examination for a new offset. When it is found out that all offsets have been examined, on the other hand, allocation is cancelled and the portal 500 is notified in Step 6006 that allocation is a failure.

Although the description given on the first embodiment with reference to FIG. 1 takes as an example the terminal 100 that includes a sensor, this invention is applicable to a terminal that does not include a sensor as long as the terminal includes an apparatus generating data or has a data generation function. Data to be measured is not limited as well. The first embodiment uses an example in which the report cycle is one-day long or less, but is also applicable to a cycle longer than a day. In that case, this invention can easily be carried out by expanding the method of carrying out the invention through the substitution of "1 day" as the maximum value of the slot cycle in the description of the first embodiment with a longer period, for example, a week or a year.

Wireless communication is used to couple the terminal 100 and the aggregation unit 200 in the example described above. In wired communication, too, the bandwidth has an upper limit and, because the concentration of data from a large number of terminals 100 simultaneously holding communication imposes load not only on the network but also the central processing unit 300, which processes the data, it is desirable to transmit data dispersed over a period of time. It is therefore obvious that the first embodiment is applicable to and effective for wired communication as well. When the first embodiment is applied to wired communication, the integration unit 200 is a switch or a router.

Although an example in which the aggregation unit 200 and the central processing unit 300 are provided separately and coupled by a backhaul line is described in the first embodiment, this invention is applicable to the line between the terminal 100 and the aggregation unit 200 also when the aggregation unit 200 and the central processing unit 300 are implemented by one physical apparatus. When a plurality of aggregation units 200 are provided and each of the aggregation units 200 is assigned an individual identifier to operate independently, the first embodiment can be applied to solve problems concerning the plurality of aggregation units 200 through the avoidance of concurrent transmission in a group made up of some of the plurality of aggregation units 200. The allocation of the same time for data transmission to groups does not cause a problem when the distance between the groups is long and a radio wave reaching from one of the groups to another of the groups is too weak to affect the other group. In other words, the first embodiment is made applicable by substituting the system-wide adjustment of data transmission timing in the description of the first embodiment with an adjustment of the timing of data transmission sessions that affect one another within the system.

Second Embodiment

Figure 10:
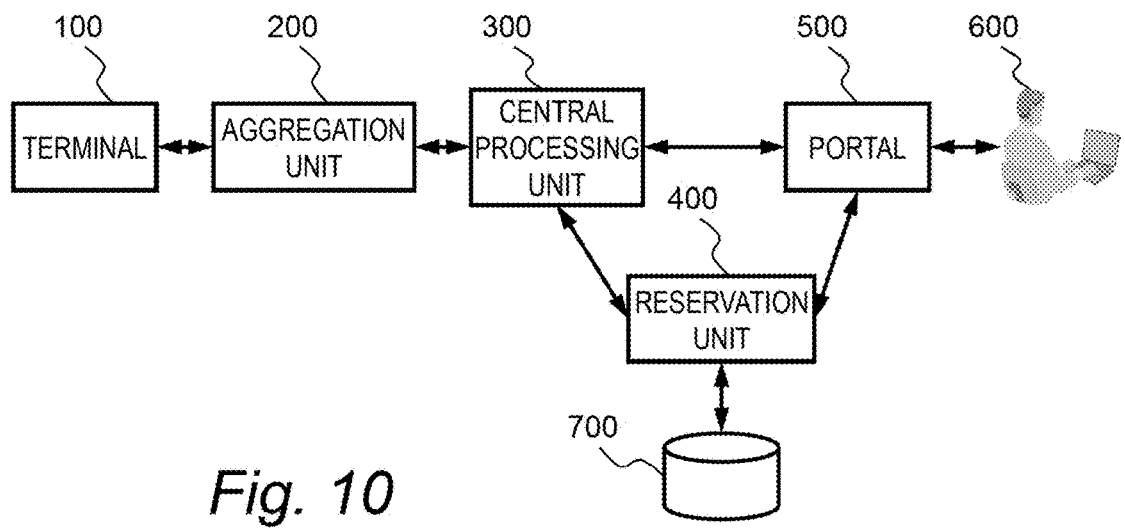
FIG. 10. is a diagram illustrating a configuration of a network system according to a second embodiment.

A second embodiment of this invention is described with reference to FIG. 10.

In this invention, the reservation unit 400 executes processing of adjusting the offset while determining whether the allocation of the same time to two or more transmission sessions can be avoided through a cross-check against information about past allocation. The processing requires reference to a large amount of information about the cycles and offsets allocated in the past when the number of terminals 100 is large. A network system of the second embodiment is accordingly configured to include the storage unit 700, which is coupled to the reservation unit 400, so that past allocation states are accumulated and managed. The storage unit 700 is configured from a database stored in a storage apparatus that is provided separately from the reservation unit 400. The storage unit 700 may be configured from a database stored in a storage apparatus that is built in the reservation unit 400.

In wireless communication, a radio wave loses some of its energy during propagation and is consequently reduced in its influence. For that reason, the area in which the aggregation unit 200 to be coupled is located is limited in the generation of new allocation, and allocation information for the limited area is retrieved from the storage unit 700 to adjust the offset so that a conflict in transmission time is avoided. Information about the new allocation is recorded in the storage unit 700 to be used for subsequent scheduling.

Allocation information is deleted from the storage unit 700 when communication is ended, and information is shared so that a slot that has been allocated becomes available again from then on. Allocation avoiding a temporal conflict is accordingly generated without requiring the user to be conscious of the offset, thereby solving the problems described above.

The storage unit 700 of the second embodiment is provided separately from the reservation unit 400 and is implemented by a large-capacity storage apparatus to store past allocation information stretching over a long period of time. The reservation unit 400 of the first embodiment, on the other hand, stores allocation information of immediate past. The second embodiment differs from the first embodiment in this regard.

Third Embodiment

Figure 11:
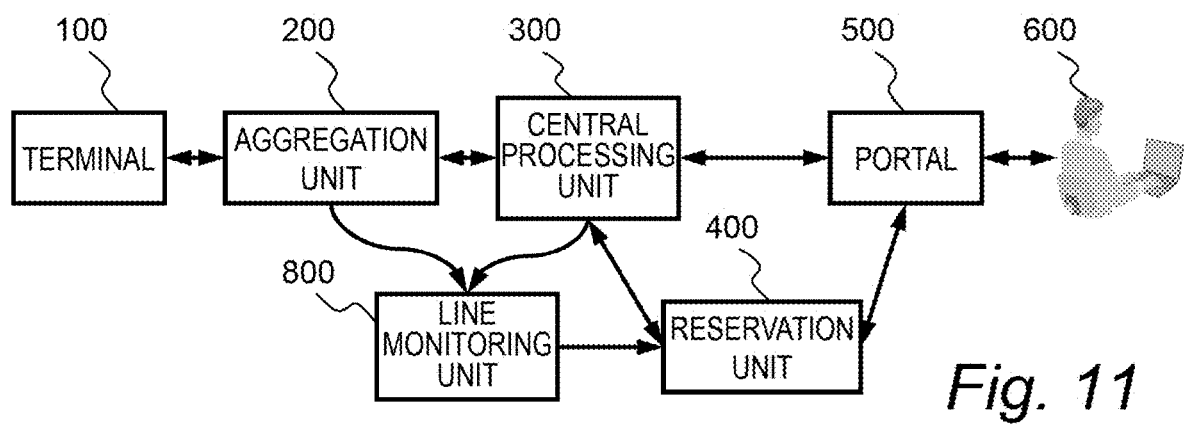
FIG. 11. is a diagram illustrating a configuration of a network system according to a third embodiment.

A third embodiment of this invention is described with reference to FIG. 11. Although a new offset is determined from information about past allocation generated by the reservation unit 400 in the second embodiment, this invention can be carried out by a method in which a new offset is determined from the actual situation of a line instead of past allocation information.

A network system of the third embodiment accordingly includes a line monitoring unit 800, which is coupled to at least one of the aggregation unit 200 and the central processing unit 300, in order to investigate the situation of at least one of the line between the terminal 100 and the aggregation unit 200 and the line between the aggregation unit 200 and the central processing unit 300. The line monitoring unit 800 has a function of monitoring the state (traffic) of a line and transmits the result of monitoring the line to the reservation unit 400. The line monitoring unit 800 may create information about available slots from the result of monitoring the line, and transmit the information about available slots to the reservation unit 400. The reservation unit 400 may build a database from the information about available slots. The database may be configured physically separately from the reservation unit 400 as described in the second embodiment. The reservation unit 400 is capable of dispensing the information about available slots (the database) investigated in advance when a channel allocation request is received from the user 600 via the portal 500.

The difference from the second embodiment is that, although allocation in the second embodiment is based on the information about past allocation, allocation in the third embodiment is based on the result of actual measurement. A method combining the method of the second embodiment and the method of the third embodiment is encompassed in this invention as well.

Fourth Embodiment

A fourth embodiment of this invention is described with reference to FIG. 12. In this invention, time requires to be synchronized throughout the system including the terminals 100. When a clock in one terminal 100 is behind, for example, the one terminal 100 with the slow clock transmits data at a specified transmission time but the transmission time is peculiar to the one terminal and is out of synchronization with a time on which the other terminals 100 rely.

In such a case, data transmission from the terminal 100 with the slow clock may conflict with transmission in a slot allocated to another terminal 100, thereby causing signal interference. The transmission of data at a predetermined time is accordingly not enough to avoid interference with another terminal 100.

Figure 12:
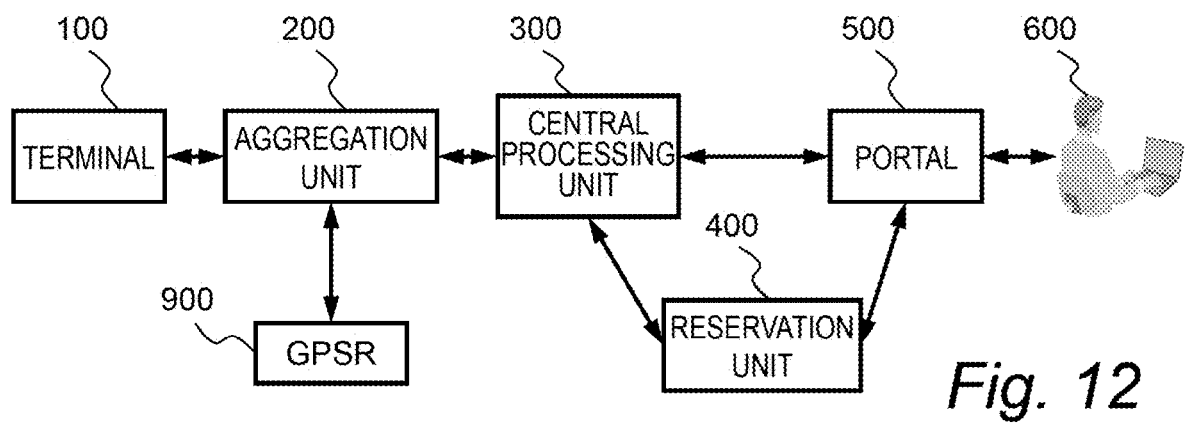
FIG. 12 is a diagram illustrating a configuration of a network system according to a fourth embodiment.

In the fourth embodiment, the aggregation unit 200 includes a GPS receiver as illustrated in FIG. 12, and transmits a synchronization signal (e.g., a beacon signal) synchronized with the GPS time to the terminal 100 to synchronize the time on the terminal 100. The terminal 100 receives the synchronization signal transmitted from the aggregation unit 200, to thereby reduce the slowing of its clock to the level of propagation delay and synchronize with the system. This method enables the remotely placed terminal 100 without a GPS receiver to synchronize with the system and keep to timing specified by the reservation unit 400.

Figure 13:
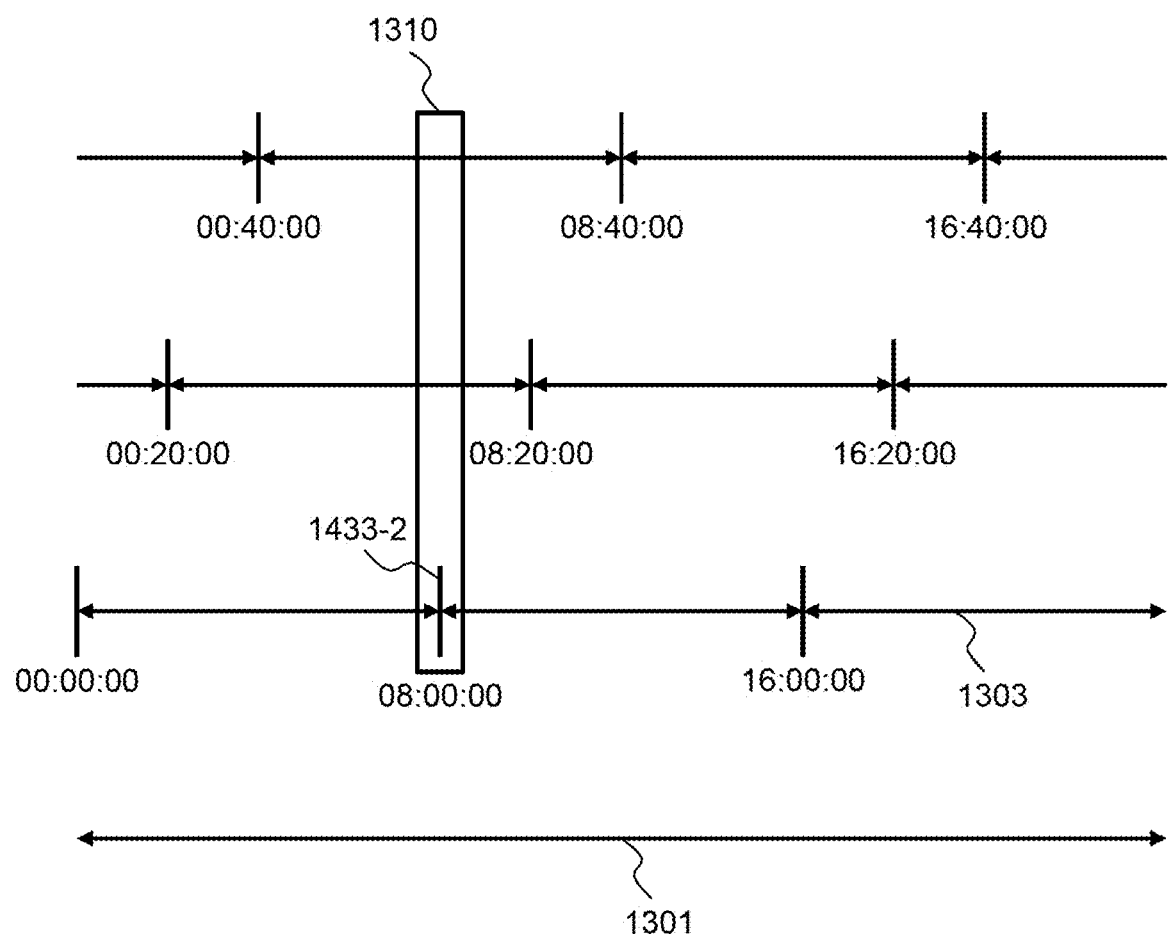
FIG. 13. is a diagram illustrating a reserved slot according to the fourth embodiment.
Figure 14:
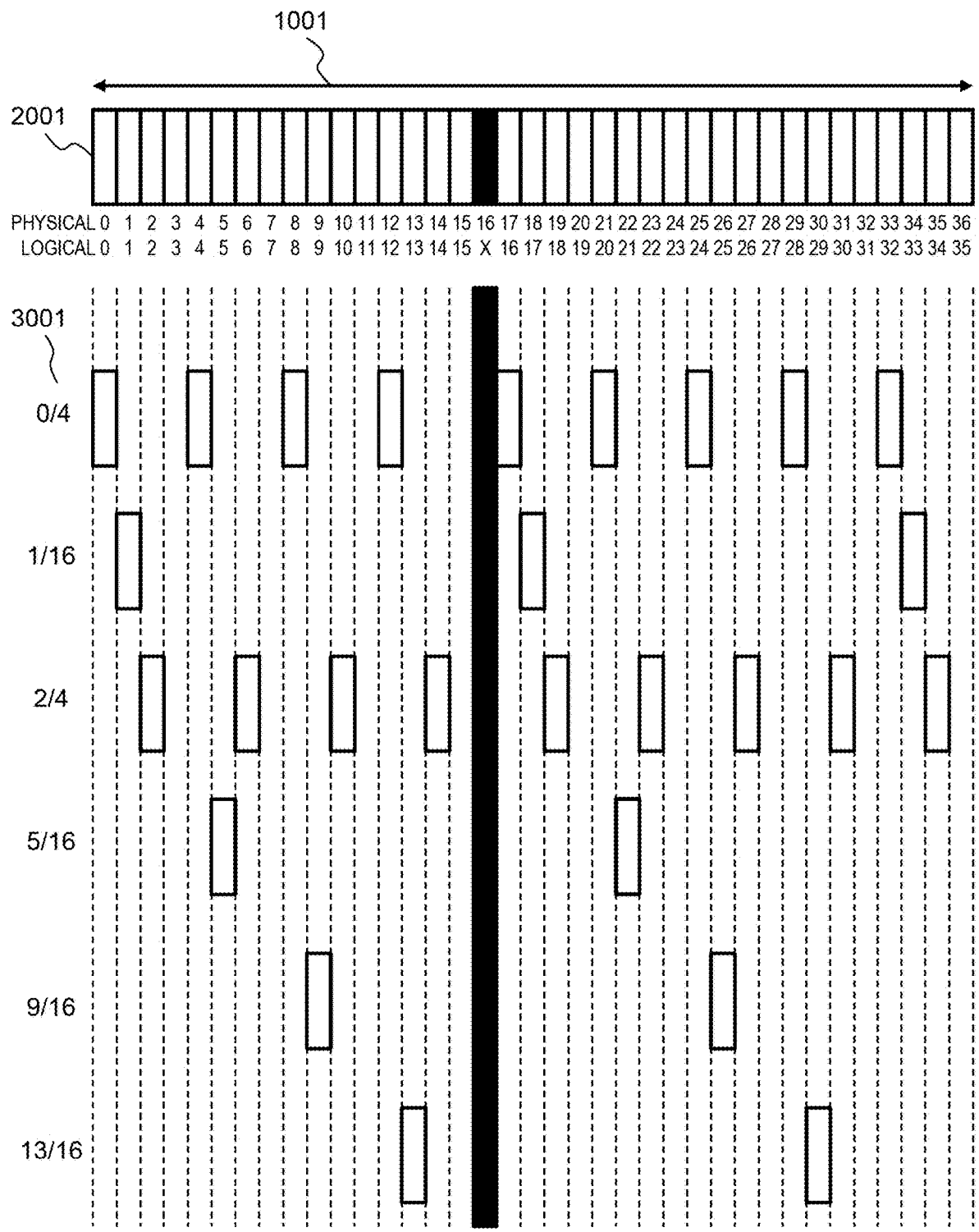
FIG. 14. is a diagram illustrating an allocation of slots including the reserved slot according to the fourth embodiment.
Figure 15:
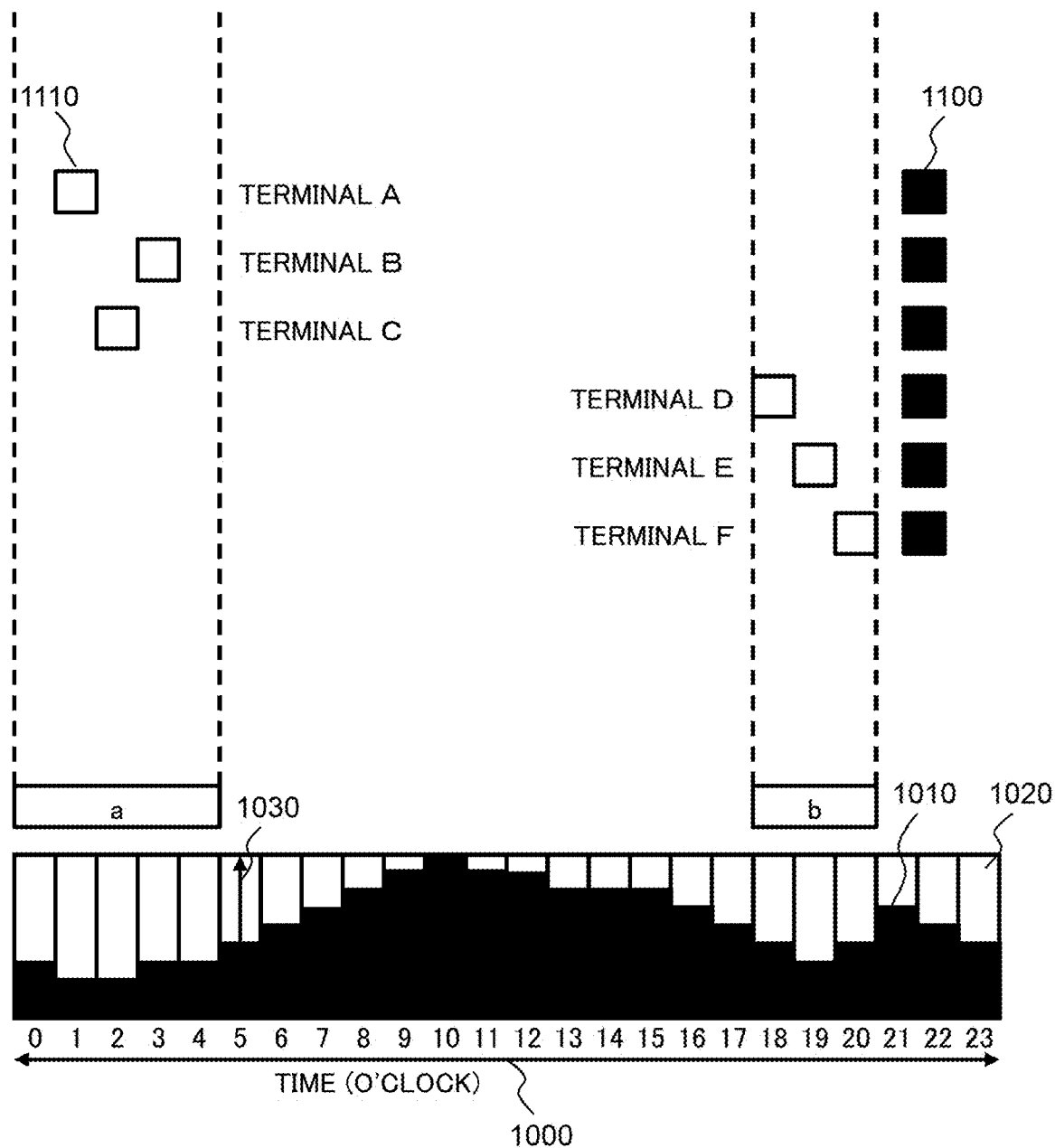
FIG. 15. is a diagram illustrating an example of use of slots in light traffic time in background technologies.
Figure 16:
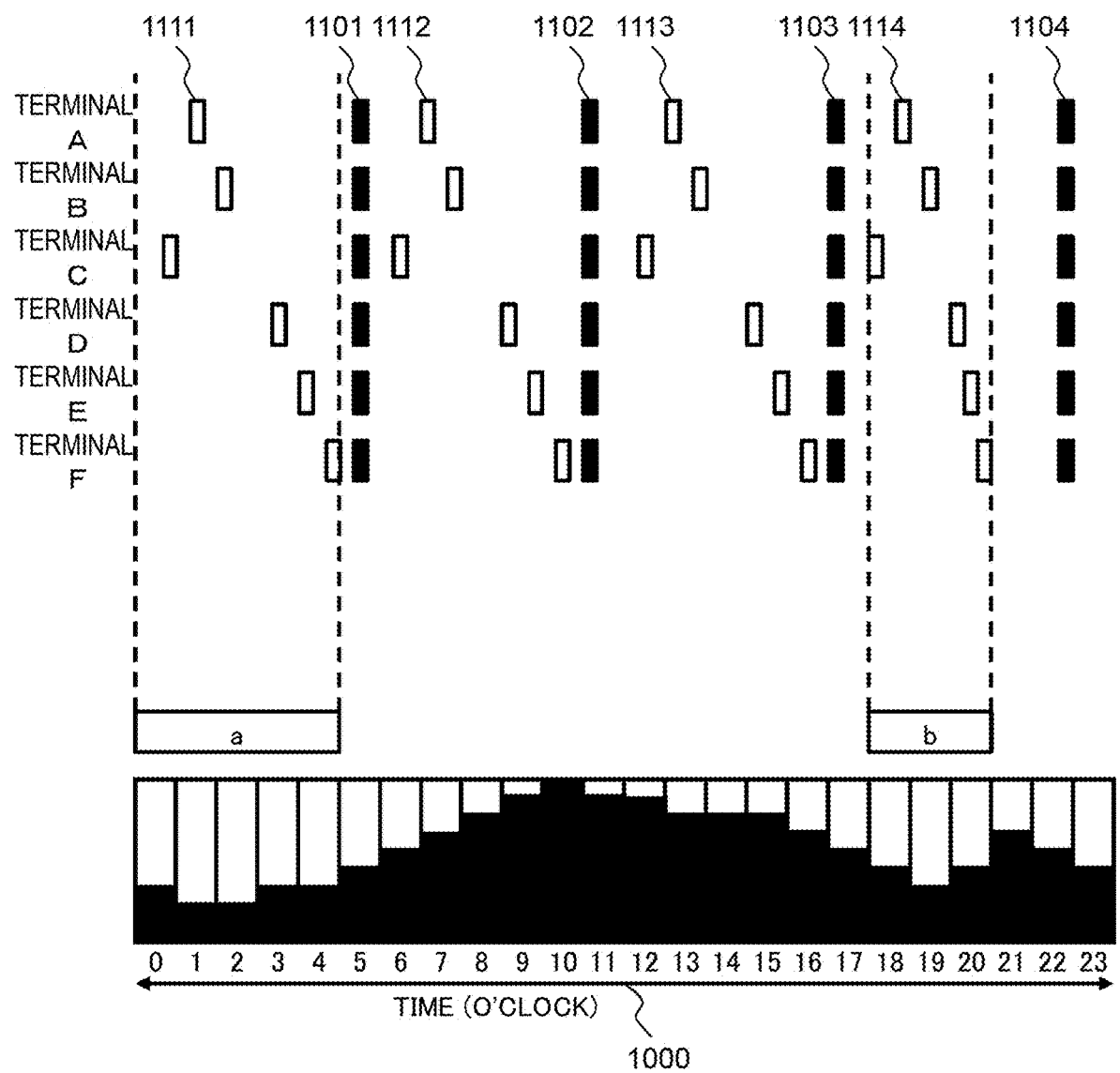
FIG. 16. is a diagram illustrating an example of use of slots in a case of increasing transmission frequency in background technologies.

This case requires a slot in which the aggregation unit 200 transmits the synchronization signal with the use of a line in addition to a slot for collecting data from the terminal 100. A slot reserved by this method is illustrated in FIG. 13. When the synchronization signal is to be transmitted at 08:00, for example, a slot enclosed by a square portion 1310 is reserved. Here, data from the terminal 100 is transmitted at timing 1433-2. When the timing of the synchronization signal transmission and the timing of the data transmission overlap, and the synchronization signal is allocated a filled slot (the sixteenth slot in FIG. 14) as illustrated in FIG. 14, the method described above can be used as it is by considering that a period (1001) having the length of a unit time is made up of thirty-six logical slots, which is calculated by subtracting the slot that is allocated to the synchronization signal from thirty-seven slots as physical components of the period. Allocation avoiding a temporal conflict is accordingly generated without requiring the user to be conscious of the offset, thereby solving the problems described above.

As described above, the reservation unit 400 in the embodiments of the present invention receives a relative time specified by the user as a time at which information is transmitted from the terminal 100, and determines an absolute time unique throughout the system as scheduling information so that interference with another communication session is avoided when the terminal 100 holds communication at the specified relative time. The line utilization ratio in data collection of a short cycle (e.g., a few minutes) is accordingly improved. This invention is effective when applied to a case in which the line uses LPWA or other unlicensed wireless methods. This invention is also effective in mobile communication provided exclusively for IoT, for example, NB-IoT discussed by 3GPP and other standardization organizations. This invention improves the development speed of application software for providing a service as well because a user is only required to specify the transmission cycle and the band, which are a broader concept, to use a network, while detailed settings of the network are hidden from the user.

The absolute time described above is determined from the offset from a reference time and the cycle specified by the user as the relative time described above, which helps to make how each user uses a line clearer than in existing services providing a line. This facilitates network management and accordingly lowers the cost of the management.

The reservation unit 400 acquires an offset at which communication interference is avoided when a cycle specified by the user is used, and notifies the acquired offset and the cycle to the terminal 100. The line utilization efficiency in data collection of a short cycle is accordingly improved.

The reservation unit 400 may also use past scheduling information obtained from the storage unit 700 to acquire an offset at which communication interference is avoided. A schedule can accordingly be determined without emitting a radio wave to see whether interference occurs. The reservation unit 400 may also use at least one of the communication path state and line state obtained from the line monitoring unit 800, to acquire an offset at which communication interference is avoided. A schedule true to the actual propagation situation can accordingly be determined while taking the propagation distance from the aggregation unit 200 into account.

The aggregation unit 200 transmits a signal for time synchronization to the terminal 100, and the terminal 100 synchronizes with the IoT system based on the received signal for time synchronization. Accordingly, the terminal 100 is capable of using an accurate time, and a schedule excluding a slot for information to be transmitted to the terminal 100 can be determined as well.

The reservation unit 400 prepares slots to be allocated to the terminal 100 at different offsets, and keeps the allocation situation of each of the slots. The reservation unit 400 searches the prepared slots for a slot in which communication interference is avoided when a cycle specified by the user is used, and notifies the offset of the found slot and the cycle to the terminal 100. A schedule can accordingly be determined quickly. In addition, efficient slot allocation is accomplished through the varying of the size of the prepared slots. Selection from a communication menu is easy as well because the user is allowed to select from created slots.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A method of managing communication in a communication system,
the communication system including:
an aggregation unit configured to receive information through a communication path from a plurality of terminals, which are sources of information transmission; and
a reservation unit configured to determine, for each of the plurality of terminals, timing at which the terminal transmits a signal,
the method comprising steps of:
receiving, by the reservation unit, a relative time specified by a user as a time at which the terminal transmits the information;
determining, by the reservation unit, as scheduling information, an absolute time unique throughout the communication system so that interference with another communication session is avoided when the terminal holds communication at the relative time, wherein the absolute time is determined based on an offset from a reference time and a cycle specified as the relative time by the user;
acquiring, by the reservation unit, an offset at which communication interference is avoided when the cycle specified by the user is used, to notify the offset and the cycle to the terminal;
preparing, by the reservation unit, slots to be allocated to the terminal at different offsets, and keep an allocation situation of each of the prepared slots; and
searching, by the reservation unit, the prepared slots for a slot in which communication interference is avoided when the cycle specified by the user is used, to notify the offset of the found slot and the cycle to the terminal.

2. The method of managing communication according to claim 1,
wherein the communication system further includes a storage unit configured to hold scheduling information set in a past, and
wherein the method further comprises a step of acquiring, by the reservation unit, an offset at which communication interference is avoided, based on the past scheduling information obtained from the storage unit.

3. The method of managing communication according to claim 1,
wherein the communication system further includes:
a central processing unit configured to receive, through a line, the information received by the aggregation unit; and
a line monitoring unit configured to obtain at least one of a state of the communication path and a state of the line, and
wherein the method further comprises a step of acquiring, by the reservation unit, an offset at which communication interference is avoided, based on at least one of the communication path state and the line state, which is obtained from the line monitoring unit.

4. The method of managing communication according to claim 1,
wherein the communication system further includes a clock configured to generate an accurate time, and
wherein the method further comprises steps of:
transmitting, by the aggregation unit, a signal for time synchronization to the terminal; and
synchronizing, by the terminal, with the communication system based on the received signal for time synchronization.

5. A communication system for collecting information from a plurality of terminals through a communication path, the communication system comprising:
an aggregation unit configured to receive information through the communication path from the plurality of terminals, which are sources of information transmission; and a reservation unit configured to determine, for each of the plurality of terminals, timing at which the terminal transmits a signal, wherein the reservation unit is configured to:

receive a relative time specified by a user as a time at which the terminal transmits the information;

determine, as scheduling information, an absolute time unique throughout the communication system so that interference with another communication session is avoided when the terminal holds communication at the relative time, wherein the absolute time is determined based on an offset from a reference time and a cycle specified as the relative time by the user;

acquire an offset at which communication interference is avoided when the cycle specified by the user is used, to notify the offset and the cycle to the terminal;

prepare slots to be allocated to the terminal at different offsets, and keep an allocation situation of each of the prepared slots; and search the prepared slots for a slot in which communication interference is avoided when the cycle specified by the user is used, to notify the offset of the found slot and the cycle to the terminal.

6. The communication system according to claim 5, further comprising a storage unit configured to hold scheduling information set in a past, wherein the reservation unit is configured to acquire an offset at which communication interference is avoided, based on the past scheduling information obtained from the storage unit.

7. The communication system according to claim 5, further comprising:

a central processing unit configured to receive, through a line, the information received by the aggregation unit; and a line monitoring unit configured to obtain at least one of a state of the communication path or a state of the line, wherein the reservation unit is configured to acquire an offset at which communication interference is avoided, based on at least one of the communication path state and the line state, which is obtained from the line monitoring unit.

8. The communication system according to claim 5, further comprising a clock configured to generate an accurate time, wherein the aggregation unit is configured to transmit a signal for time synchronization to the terminal, and wherein the terminal is configured to synchronize with the communication system based on the received signal for time synchronization.

9. A non-transitory machine-readable storage medium, containing at least one sequence of instructions for managing communication in a communication system, the communication system including:

an aggregation unit configured to receive information through a communication path from a plurality of terminals, which are sources of information; and a reservation unit configured to determine, for each of the plurality of terminals, timing at which the terminal transmits a signal, the instructions that, when executed, causes the communication management apparatus to:

receive a relative time specified by a user as a time at which the terminal transmits the information; and determine an absolute time unique throughout the communication system as scheduling information so that interference with another communication session is avoided when the terminal holds communication at the relative time, wherein the absolute time is determined based on an offset from a reference time and a cycle specified as the relative time by the user;

acquire, by the reservation unit, an offset at which communication interference is avoided when the cycle specified by the user is used, to notify the offset and the cycle to the terminal;

prepare, by the reservation unit, slots to be allocated to the terminal at different offsets, and keep an allocation situation of each of the prepared slots; and search, by the reservation unit, the prepared slots for a slot in which communication interference is avoided when the cycle specified by the user is used, to notify the offset of the found slot and the cycle to the terminal.

* * * * *